(12) United States Patent
Schulz et al.

(10) Patent No.: US 11,168,506 B2
(45) Date of Patent: Nov. 9, 2021

(54) SYSTEM FOR ADJUSTING A CLOSURE ELEMENT OF A VEHICLE

(71) Applicant: BROSE FAHRZEUGTEILE GMBH & CO. KG, BAMBERG, Bamberg (DE)

(72) Inventors: Johannes Schulz, Bamberg (DE); Sebastian Hermeling, Bamberg (DE)

(73) Assignee: Brose Fahrzeugteile GmbH & Co. KG, Bamberg (DE)

( * ) Notice: Subject to any disclaimer, the term of this patent is extended or adjusted under 35 U.S.C. 154(b) by 100 days.

(21) Appl. No.: 16/037,611

(22) Filed: Jul. 17, 2018

(65) Prior Publication Data
US 2019/0078373 A1 Mar. 14, 2019

(30) Foreign Application Priority Data
Sep. 8, 2017 (DE) .................... 10 2017 215 931.6

(51) Int. Cl.
*E05F 15/00* (2015.01)
*E05F 15/73* (2015.01)
(Continued)

(52) U.S. Cl.
CPC ............ *E05F 15/73* (2015.01); *B60Q 1/0023* (2013.01); *B60Q 1/323* (2013.01); *B60Q 1/50* (2013.01);
(Continued)

(58) Field of Classification Search
CPC . E05F 15/73; E05F 15/40; E05F 15/77; E05F 15/74; E05F 2015/763;
(Continued)

(56) References Cited

U.S. PATENT DOCUMENTS 4,674,230 A * 6/1987 Takeo .................. E05C 17/003
49/28
5,074,073 A * 12/1991 Zwebner ................. E05F 5/025
49/26
(Continued)

FOREIGN PATENT DOCUMENTS

CN 201357798 Y 12/2009
CN 103101476 A 5/2013
(Continued)

OTHER PUBLICATIONS

Chinese First Office action dated Feb. 3, 2020 issued in corresponding CN Application No. 201811052012.3 8 pages, with translation, 3 pages.

*Primary Examiner* — Jerry E Redman
(74) *Attorney, Agent, or Firm* — Lewis Roca Rothgerber Christie LLP

(57) ABSTRACT

A system for adjusting a closure element of a vehicle comprises an adjustment drive for adjusting the closure element relative to a vehicle body of the vehicle between a closed position and an open position, a control device for actuating the adjustment drive for executing an adjusting movement of the closure element between the closed position and the open position, and a light generating device for generating a light signal. The control device is configured to actuate the light generating device for generating a first light signal during an adjusting movement of the closure element and for generating a second light signal when the closure element is in the open position.

11 Claims, 11 Drawing Sheets

(51) Int. Cl.
  *B60Q 1/32* (2006.01)
  *B60Q 1/50* (2006.01)
  *E05F 15/40* (2015.01)
  *E05F 15/77* (2015.01)
  *B60Q 1/00* (2006.01)

(52) U.S. Cl.
  CPC .............. *B60Q 1/503* (2013.01); *E05F 15/40* (2015.01); *E05F 15/77* (2015.01); *B60Q 2400/40* (2013.01); *B60Q 2400/50* (2013.01); *E05F 2015/763* (2015.01); *E05F 2015/765* (2015.01); *E05Y 2400/54* (2013.01); *E05Y 2400/812* (2013.01); *E05Y 2400/82* (2013.01); *E05Y 2400/822* (2013.01); *E05Y 2400/852* (2013.01); *E05Y 2800/106* (2013.01); *E05Y 2900/531* (2013.01)

(58) Field of Classification Search
  CPC ..... E05F 2015/765; B60Q 1/323; B60Q 1/50; B60Q 1/0023; B60Q 1/503; B60Q 2400/40; B60Q 2400/50; E05Y 2400/82; E05Y 2400/822; E05Y 2400/812; E05Y 2400/54; E05Y 2400/852; E05Y 2800/106; E05Y 2900/531
  See application file for complete search history.

(56) References Cited

U.S. PATENT DOCUMENTS

| | | | |
|---|---|---|---|
| 5,121,098 A * | 6/1992 | Chen | B60Q 1/2696 340/457 |
| 7,175,227 B2 * | 2/2007 | Menard | E05F 15/43 296/146.1 |
| 8,234,817 B2 * | 8/2012 | Neundorf | E05B 81/20 49/28 |
| 8,414,062 B2 * | 4/2013 | Gobart | E05D 11/1028 16/82 |
| 9,637,965 B1 * | 5/2017 | Kothari | E05F 15/76 |
| 10,030,431 B2 * | 7/2018 | Elie | E05F 15/77 |
| 10,428,559 B1 * | 10/2019 | Nepomuceno | G01S 13/931 |
| 10,571,283 B1 * | 2/2020 | Nepomuceno | G01C 21/3461 |
| 10,593,197 B1 * | 3/2020 | Nepomuceno | G08G 1/205 |
| 10,596,958 B2 * | 3/2020 | Rowell | B60Q 1/525 |
| 2005/0280284 A1 * | 12/2005 | McLain | B60R 13/043 296/146.1 |
| 2008/0218381 A1 * | 9/2008 | Buckley | B60Q 1/50 340/932.2 |
| 2008/0296926 A1 | 12/2008 | Hanzel et al. | |
| 2008/0296927 A1 * | 12/2008 | Gisler | E05F 15/43 296/146.4 |
| 2008/0309118 A1 * | 12/2008 | Kohlstrand | E05D 11/1007 296/146.1 |
| 2011/0260848 A1 * | 10/2011 | Rodriguez Barros | B60Q 1/323 340/438 |
| 2013/0120130 A1 | 5/2013 | Cha | |
| 2015/0298598 A1 | 10/2015 | Nussli | |
| 2017/0021759 A1 | 1/2017 | Zhang et al. | |
| 2017/0113652 A1 | 4/2017 | Tokudome | |
| 2017/0190314 A1 | 7/2017 | Ette et al. | |

FOREIGN PATENT DOCUMENTS

| | | |
|---|---|---|
| CN | 205573744 U | 9/2016 |
| CN | 106696819 A | 5/2017 |
| DE | 102006036061 A1 | 2/2008 |
| DE | 10 2008 025 669 A1 | 12/2008 |
| DE | 10 2016 120 020 A1 | 4/2017 |
| DE | 10 2016 100 069 A1 | 7/2017 |
| EP | 2 740 632 A1 | 6/2014 |
| KR | 100796380 B1 | 1/2008 |

* cited by examiner

FIG 1
FIG 2
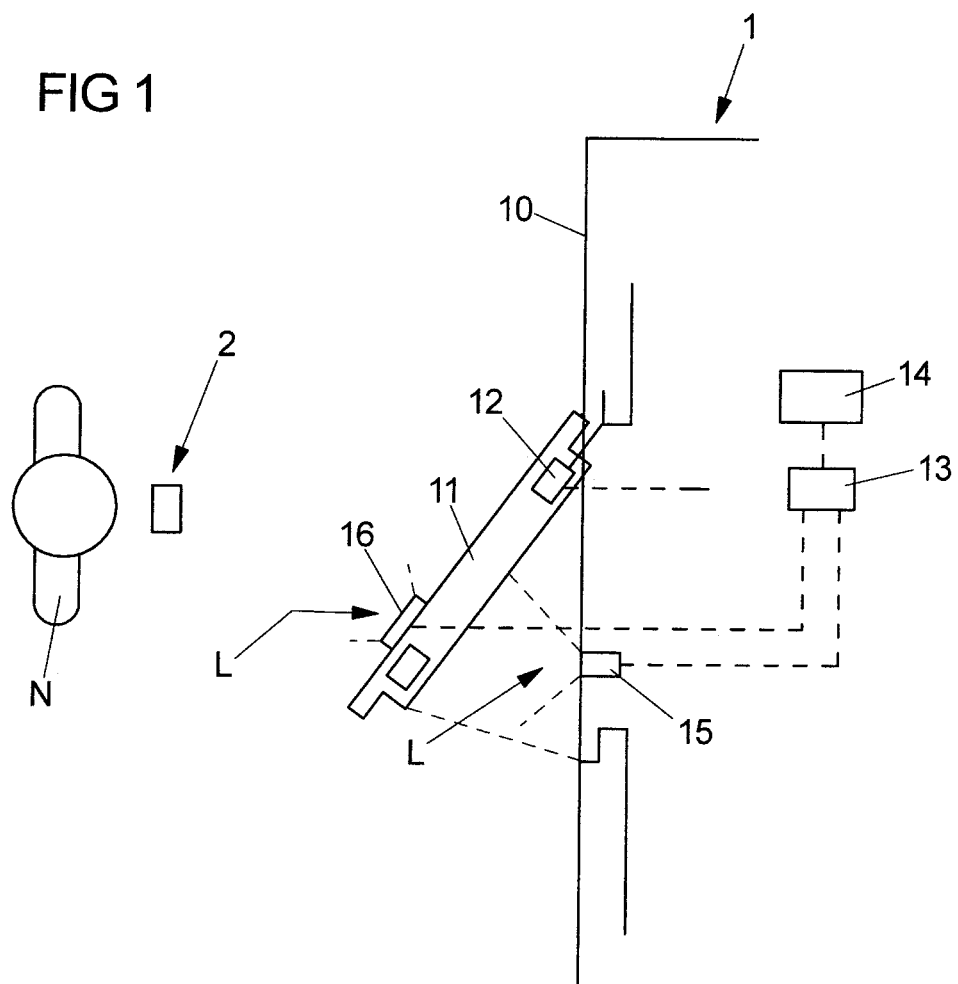
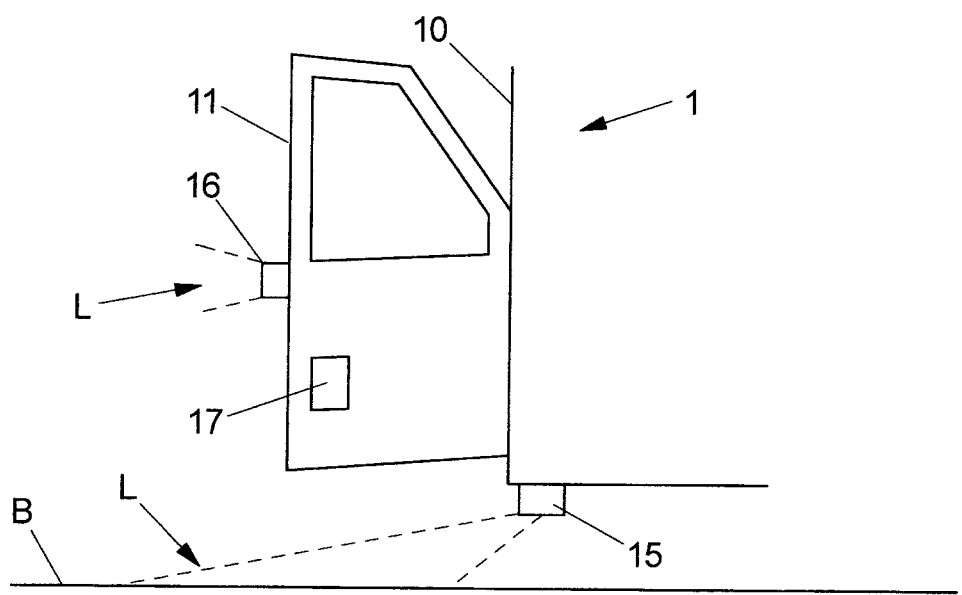

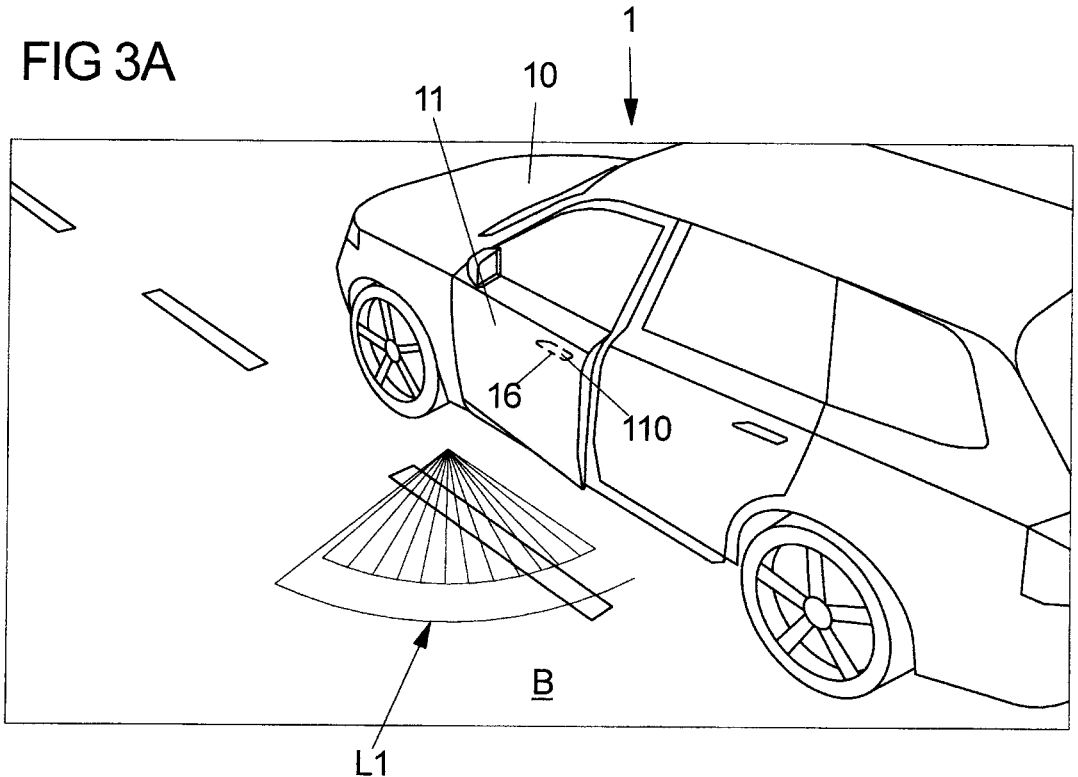
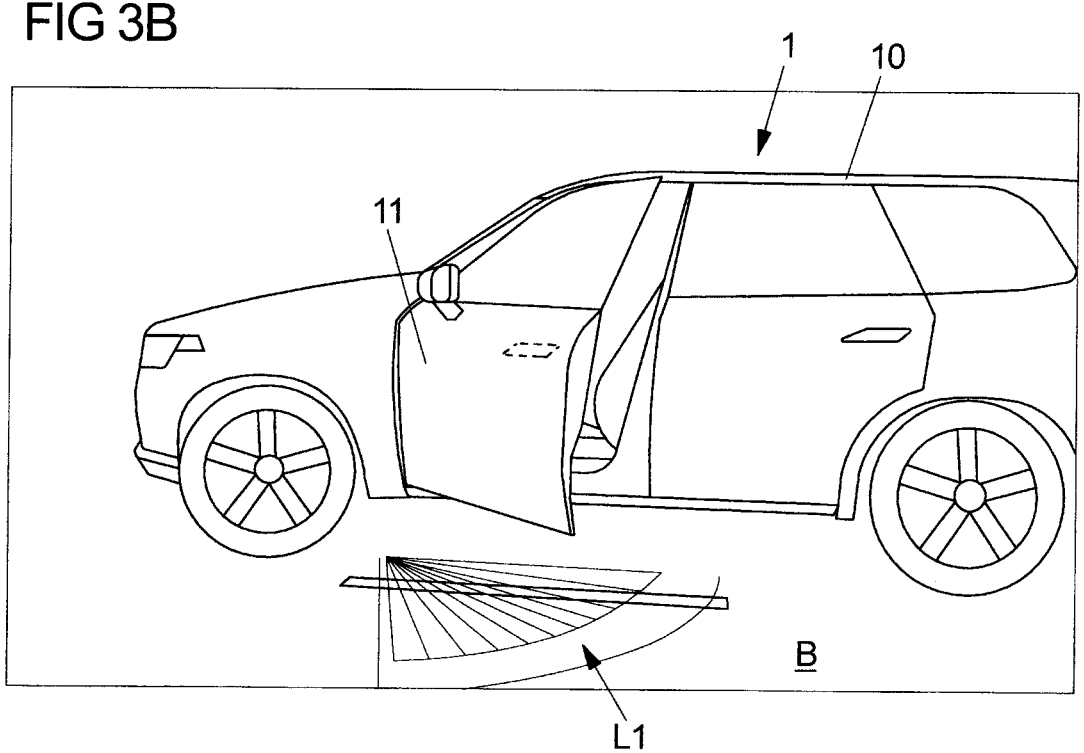

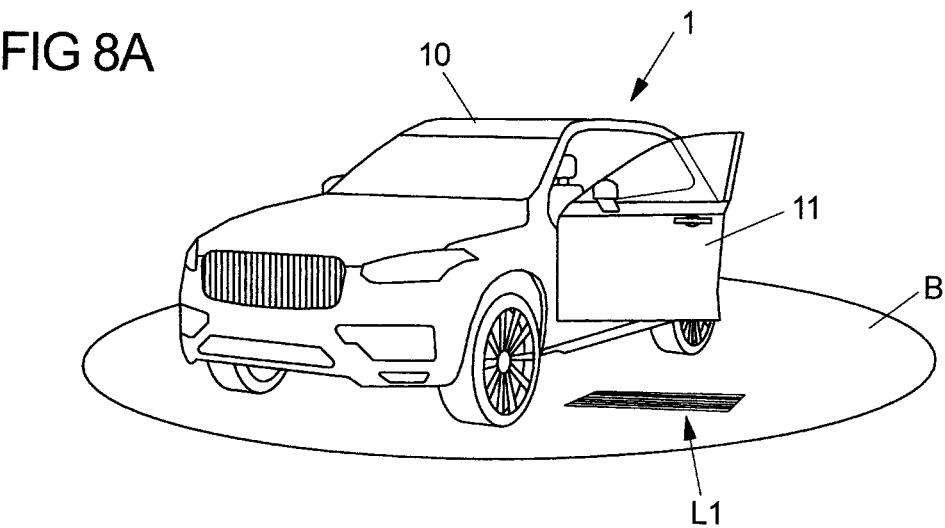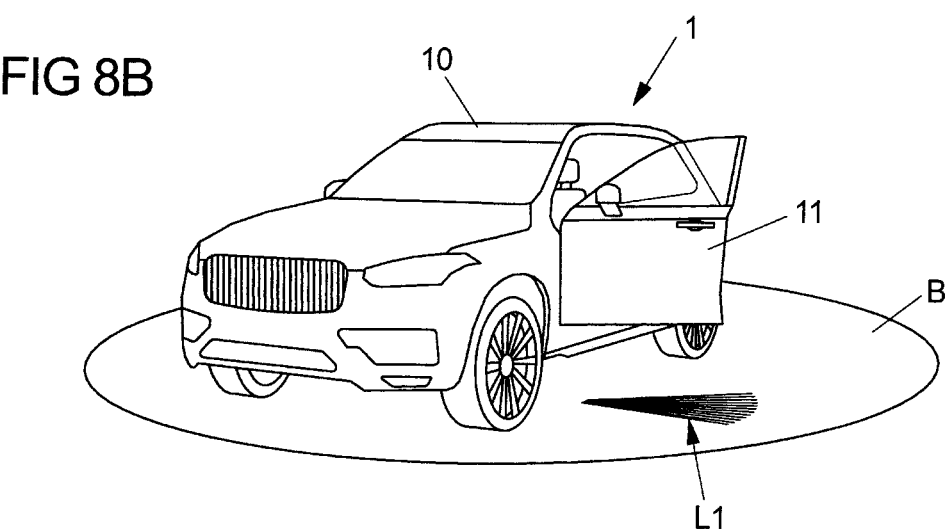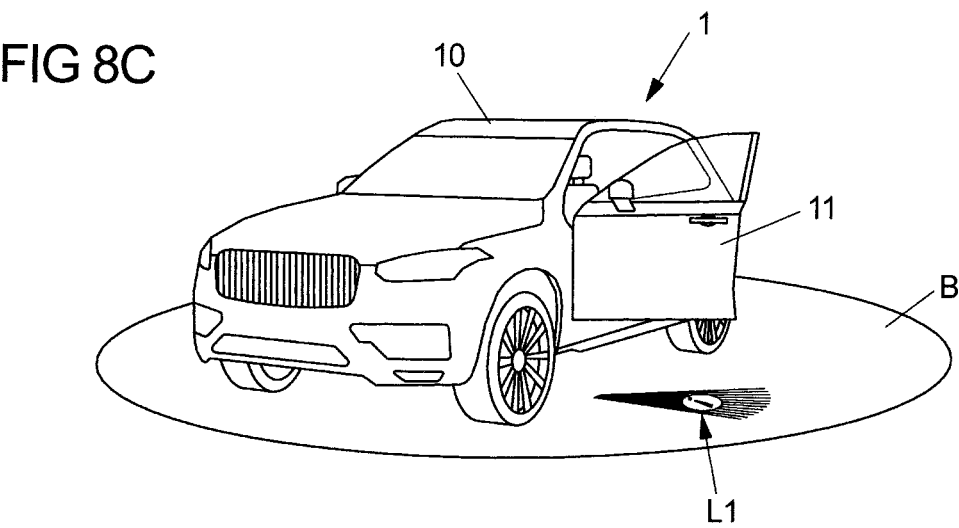

SYSTEM FOR ADJUSTING A CLOSURE ELEMENT OF A VEHICLE

CROSS-REFERENCE TO RELATED APPLICATION

This application claims priority to German Patent Application No. 10 2017 215 931.6 filed on Sep. 8, 2017, the entirety of which is incorporated by reference herein.

BACKGROUND

This invention relates to a system for adjusting a closure element of a vehicle and to a method for adjusting a closure element of a vehicle.

Such a closure element serves for closing a vehicle opening and can be formed for example by a vehicle side door, a liftgate or also another vehicle door or a flap element on a vehicle. The closure element can be opened in order to thereby clear a vehicle opening and to enable a user to have access to the vehicle, for example in order to board the vehicle or to have access to a loading space of the vehicle.

Such a system comprises an adjustment drive for adjusting the closure element relative to a vehicle body of the vehicle between a closed position and an open position, a control device for actuating an adjustment drive for executing an adjusting movement of the closure element between the closed position and the open position, and a light generating device for generating a light signal.

In adjustment systems for adjusting vehicle doors, for example a vehicle side door, the adjustment is effected electromotively and thus largely noiselessly. The adjustment here is initiated by a user, for example via a communication device in the form of a radio key or a mobile phone or the like. It can be desirable here to provide a user or another passer-by with a feedback on an adjusting operation at a vehicle door, so that for example a collision with an opening vehicle door can be avoided.

SUMMARY

It is an object of the present invention to provide a system and a method for adjusting a closure element of a vehicle, which can inform a user of an adjusting operation in an easily perceptible way.

This object is solved by a system for adjusting a closure element of a vehicle with features as described herein.

Accordingly, the control device is configured to actuate the light generating device for generating a first light signal during an adjusting movement of the closure element and for generating a second light signal when the closure element is in the open position.

An adjusting operation is initiated by a user, for example via a suitable communication device in the form of a radio key, a remote control unit or a mobile phone, or also via an actuating device within the vehicle, for example a button or the like. When the control device, triggered by the user, actuates the adjustment drive for executing an adjusting movement of the closure element, a first light signal is generated via the light generating device, which thus informs the user of the adjusting movement of the closure element. A user thus receives a direct, optical feedback that the adjusting operation is triggered and carried out.

When an open position is reached, the control device actuates the light generating device to output another, second light signal, which indicates that the closure element now is in the open position. It thus is signaled to a user that the closure element is in a position in which a user has access to the vehicle, i.e. the user for example can board the vehicle via an open vehicle side door or can access to a loading space in the vehicle when the liftgate is open. A user thus receives a direct information that an adjusting operation for opening the closure element, for example a vehicle side door or a liftgate, is completed, so that the user now has access to the vehicle via the vehicle opening cleared by the closure element.

Because on the one hand an adjusting movement is indicated directly via the first light signal and on the other hand the reaching of an open position is signaled via the second light signal, an improved user comfort and also an increased user safety can be achieved.

In one aspect, the light generating device can include a projection device for generating a light projection on a ground outside the vehicle. By means of such a projection device light signals are projected onto the ground in the region of the closure element, for example in a region in front of a liftgate or in front of a vehicle side door, which indicate an adjusting operation or signal the reaching of an open position.

Alternatively or in addition, the light generating device can include a light element, for example a strip-shaped light element, for example an LED strip, in order to generate light signals by means of such a light element. Such a light element, for example in the form of an LED strip, can be arranged for example on a door handle of a vehicle door or also on the vehicle body.

In principle, the light signals generated by means of the light generating device can be monochrome, polychrome or also colorless (black-and-white). The generated light signals here can also be different in color, so that the first light signal for example has a first color and the second light signal for example has another, second color.

In addition, the first light signal and/or the second light signal can be temporally variable. For example, the first light signal and/or the second light signal can include different signals. Static signals here can be superimposed with dynamic, temporally variable signals.

The first light signal for example can mark a region that is swept by the closure element on adjustment. The first light signal thus indicates over what regions the closure element is moved on adjustment (on opening or closing), so that a user is informed about the region in which there possibly is a risk of collision with the closure element, so that he can step out of the adjusting region of the closure element.

The first light signal for example can have a warning color (e.g. red).

The first light signal for example can also mark an opening limit up to which the closure element opens on adjustment into the open position. The user thus is informed at an early stage as to how far the closure element moves up to the open position.

The second light signal, on the other hand, in one aspect can mark a region for an access of a user to the vehicle. The second light signal thus marks such a region for a user, in which the user can move for example for boarding the vehicle or for accessing a loading space of the vehicle. The second light signal thus signals the region cleared by the closure element and for example can also illuminate this region, so that the user comfort is increased for example for boarding the vehicle or for accessing a vehicle loading space.

The second light signal in particular can also include signal elements for welcoming a user in the sense of a so-called welcome scenario. In connection with the second light signal words such as "Welcome" or the like can be depicted. Signal elements here can also be individualized for a user, so that a user can be welcomed personally. When a user has identified himself to the control device of the vehicle for example via a suitable communication device, for example in the form of an individual radio key, and the control device thus has knowledge of the identity of the user, a user for example can be welcomed by name by a suitable depiction in the second light signal, wherein the second light signal also can be designed in dependence on an individual user configuration.

In one aspect, the system includes a sensor device for detecting an object in the region of a possible adjustment path of the closure element on opening and/or for detecting a possible collision with an object on opening. Such a sensor device for example is designed as a proximity sensor, for example in the form of an optical sensor, an ultrasonic sensor or a radar system. By means of the sensor device it can thus be detected whether an object (static) is present in the region of the adjustment path of the closure element or whether a (dynamic) object, for example a cyclist, approaches the region of the adjustment path of the closure element, so that there possibly is a risk of collision.

Depending on a detection via the sensor device, the entered light signals then can also be adapted. For example—when it is determined by means of a detection via the sensor device that an object (for example a parking foreign vehicle) is present in the region of the adjustment path of the closure element—the opening limit (up to which the closure element moves on opening) can be adapted such that the closure element does not collide with the object on opening, i.e. for example does not abut against the parking foreign vehicle. The opening path thus is limited such that a collision is avoided.

Correspondingly, the first light signal then can also be adapted, so that the first light signal indicates the opening limit up to which the closure element is moved on opening.

In addition, the second light signal also is adapted advantageously in this case, so that the second light signal depends on the particular opening limit and, when the closure element is open, indicates the region via which a user has access to the vehicle, i.e. for example can board the vehicle or can have access to a loading space of the vehicle.

In one aspect, the control device additionally is configured to actuate the light generating device for generating a third light signal when there is a risk of collision with an object during an adjusting movement of the closure element. When it is recognized by means of the sensor device that a (dynamic) object (for example a cyclist) approaches the region over which the closure element is moved on adjustment, an optical warning signal in the form of a third light signal can be output, which warns a user and possibly also for example an approaching cyclist against the imminent collision.

Light signals in particular in the form of the first light signal and/or of the third light signal in principle can be indicated not only on opening of the closure element, i.e. when moving from the closed position into the open position, but also on closing of the closure element.

The object is also solved by a method for adjusting a closure element of a vehicle, including:
actuation of an adjustment drive, by a control device, for executing an adjusting movement of the closure element relative to a vehicle body of the vehicle between a closed position and an open position, and
generation of a light signal by a light generating device,
wherein the control device actuates the light generating device for generating a first light signal during an adjusting movement of the closure element and for generating a second light signal when the closure element is in the open position.

The advantages and advantageous aspects described above for the system analogously are also applicable to the method, so that reference is made to the above explanations.

BRIEF DESCRIPTION OF THE DRAWINGS

The idea underlying the invention will be explained in detail below with reference to the exemplary embodiments illustrated in the Figures.

FIG. 1 shows a schematic view of a vehicle with a closure element in the form of a vehicle side door that is to be adjusted electromotively via an adjustment drive.

FIG. 2 shows a further schematic view of a vehicle.

FIGS. 3A-3C show views of a vehicle on opening of a vehicle side door, with a projected first light signal.

FIGS. 8A-8C show views of a vehicle with different first light signals.

DETAILED DESCRIPTION

Figure 3C:
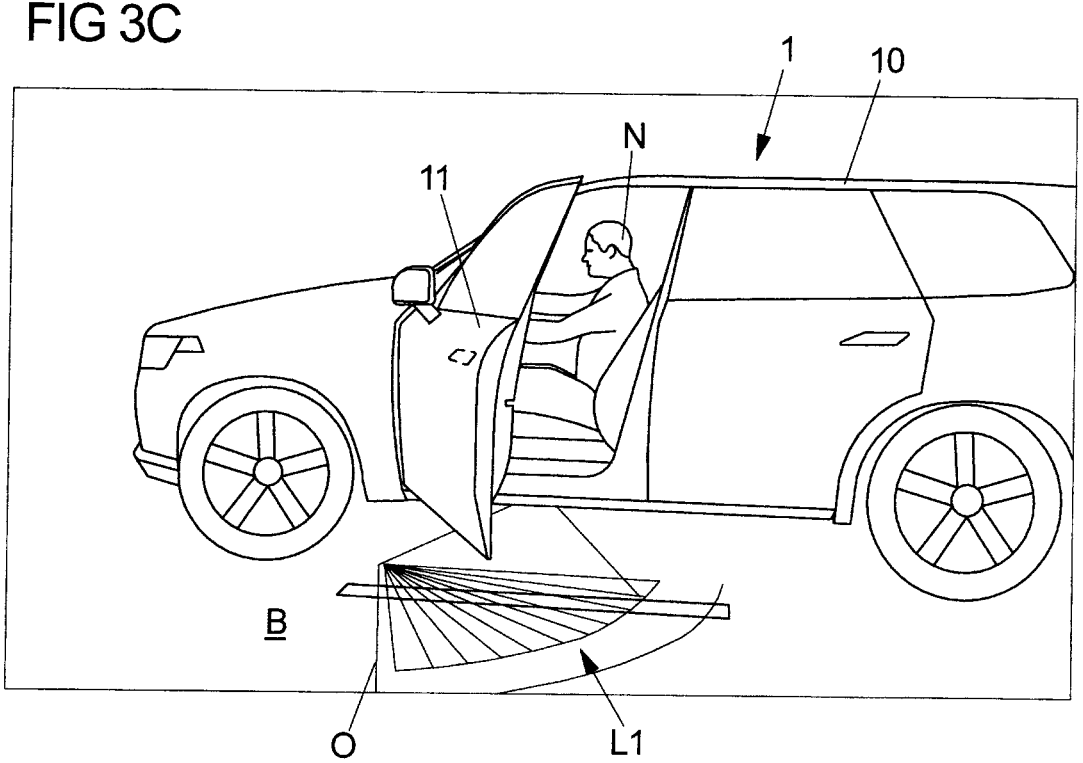

FIGS. 1 and 2 show schematic views of a vehicle 1 that includes a closure element in the form of a vehicle (side) door 11 adjustably arranged on a vehicle body 10, which can be moved relative to the vehicle body 10 between a closed position and an open position via an electromotive adjustment drive 12.

The adjustment drive 12 is part of a system for adjusting the vehicle door 11 between a closed position and an open position. The system includes a control device 13, a communication device 14, light generating devices in the form of a projection device 15 and a light element 16, and a sensor device 17, which cooperate during an adjusting operation of the vehicle door 11.

The control device 13 serves for actuating the electromotive adjustment drive 12 for adjusting the vehicle door 11 relative to the vehicle body 10. An adjusting operation can be initiated for example by a user N outside the vehicle 1, who has a communication device 2 for example in the form of a radio key, a remote control unit, a mobile phone or the like, which wirelessly communicates with the communication device 14 in order to authorize the user N and trigger a control command for example opening the vehicle door 11.

The control device 13 is designed to actuate the projection device 15 and/or the light element 16 in dependence on a position of the vehicle door 11 or an adjusting operation of the vehicle door 11 in order to inform a user N of an opening or closing movement of the vehicle door 11 and signal to a user N that the vehicle door 11 for example has been transferred into its open position and a user N thus can board the vehicle.

By means of the projection device 15 a light signal L is generated on the ground B in a region in front of the vehicle door 11, which contains information for the user N.

On opening of the vehicle door 11, as this is shown in FIGS. 3A to 3C, the projection device 15 generates a first light signal L1 on the ground B in front of the vehicle door 11, which indicates the adjusting movement of the vehicle door 11 and marks such a region over which the vehicle door 11 moves on opening (or inversely on closing). The first light signal L1 marks the limit of the opening region and the position of the vehicle door 11 in the open position by means of an optically marked opening limit O, so that a user N is informed of the point up to which the vehicle door 11 will move on opening and in what region he/she should not stay during the adjusting movement of the vehicle door 11.

The first light signal L1 for example can have a warning color (red). The first light signal L1 can be variable dynamically, so that by means of the first light signal L1 for example a current (dynamically changing) position of the vehicle door 11 is signaled and thus the dynamic adjusting movement is also marked optically.

Figure 4:
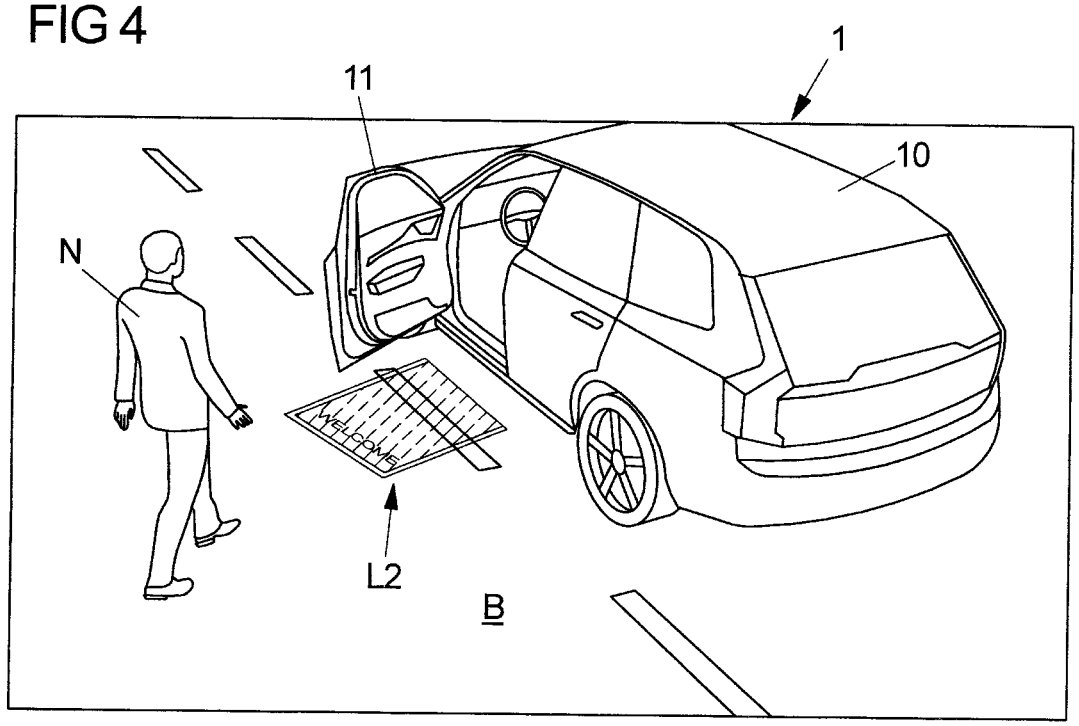
FIG. 4 shows a view of a vehicle with open vehicle side door, with a second light signal for indicating a boarding region for a user.
Figure 5A:
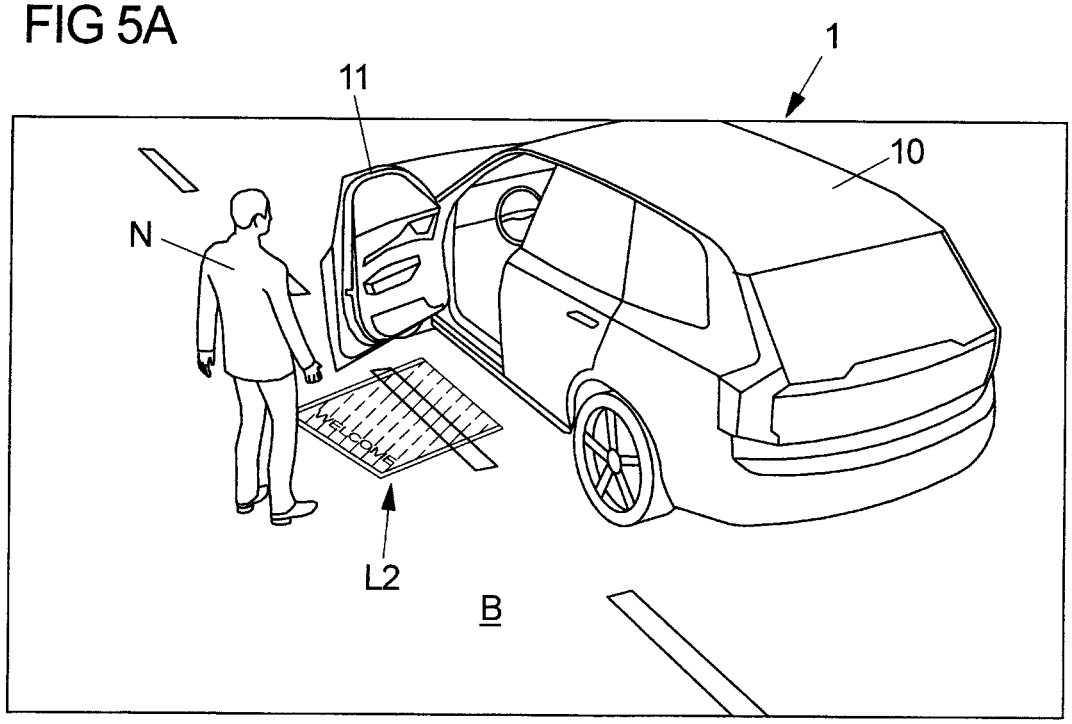
FIGS. 5A, 5B show views of the vehicle on boarding of a user.
Figure 5B:
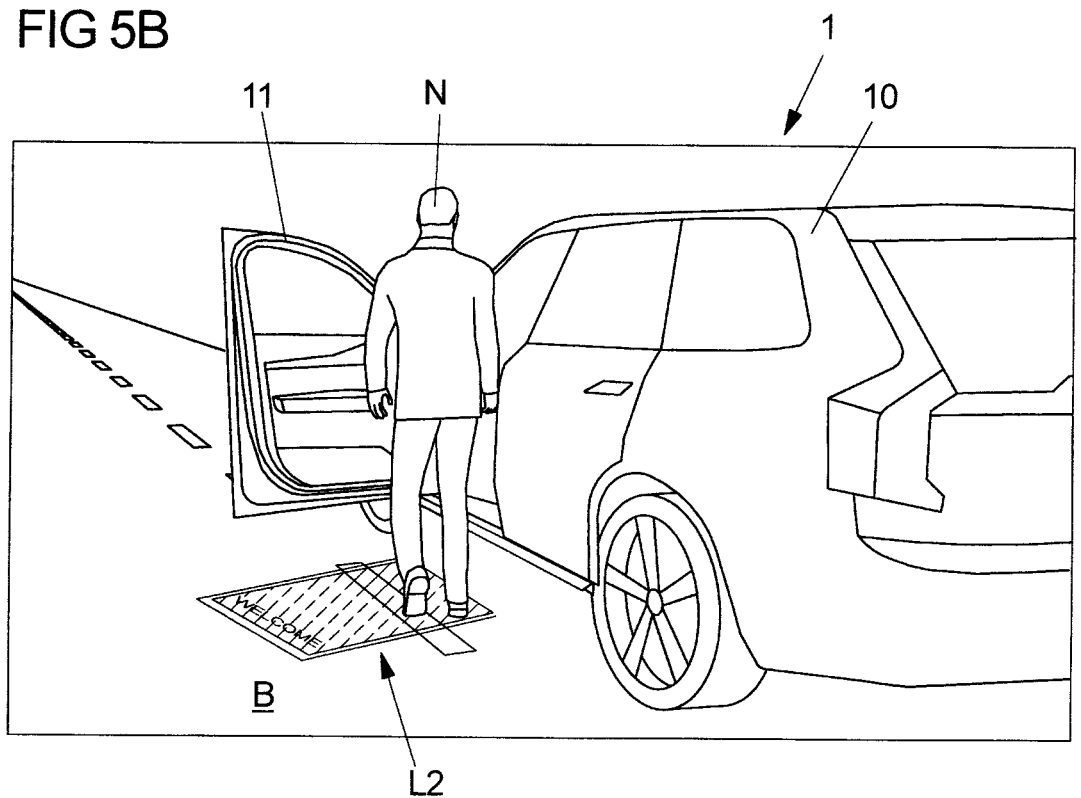

When the open position is reached, the control device 13 actuates the projection device 15 for projecting a second light signal L2, as it is shown in FIGS. 4 and 5A, 5B. The second light signal L2 marks such a region that is available to a user N for example for boarding the vehicle 1, in particular such a region that is cleared by the vehicle door 11 after opening. A user N thus can board the vehicle 1, as this is shown in FIGS. 5A and 5B.

The second light signal L2 for example can also welcome the user N and for this purpose contain word elements ("Welcome"). Parts of the second light signal L2 for welcoming the user N can also be individualized for the user N and for example be displayed user-dependently, in particular in dependence on an identification of the user N through communication of the communication device 2 of the user N with the communication device 14 of the vehicle 1.

The second light signal can have a pleasant, welcoming coloring, for example in green colors.

Figure 6A:
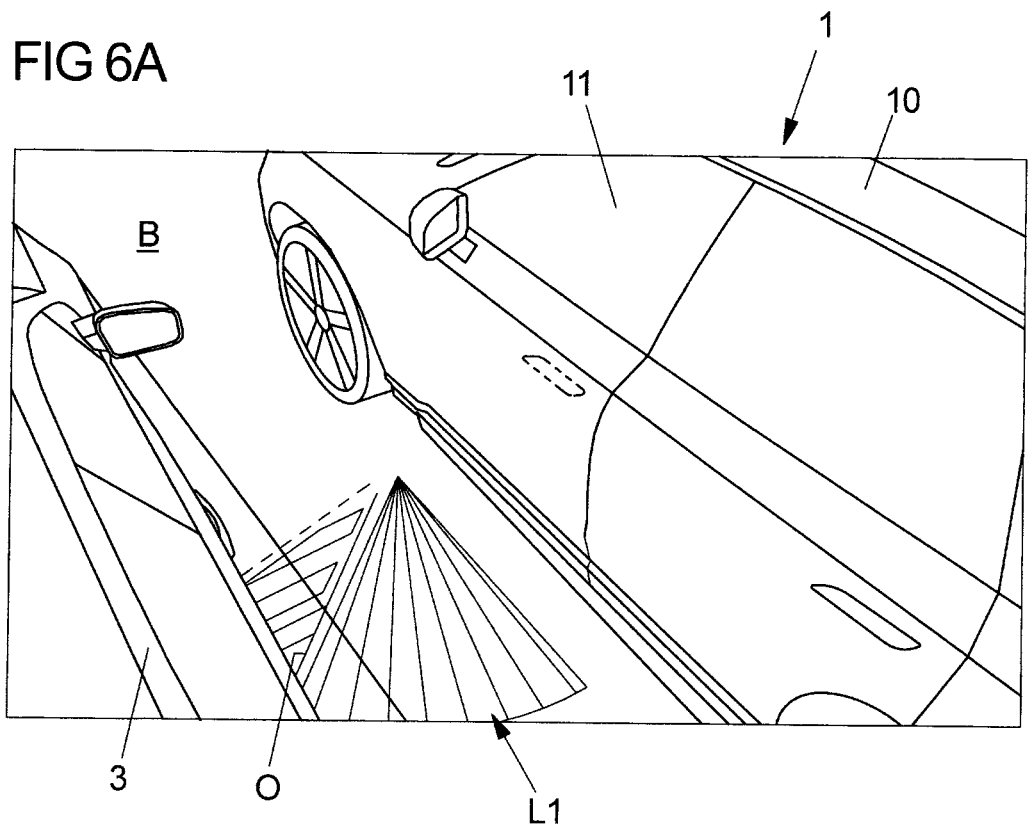
FIGS. 6A, 6B show views of a vehicle on opening of a vehicle side door, in dependence on a foreign vehicle parking beside the vehicle.
Figure 6B:
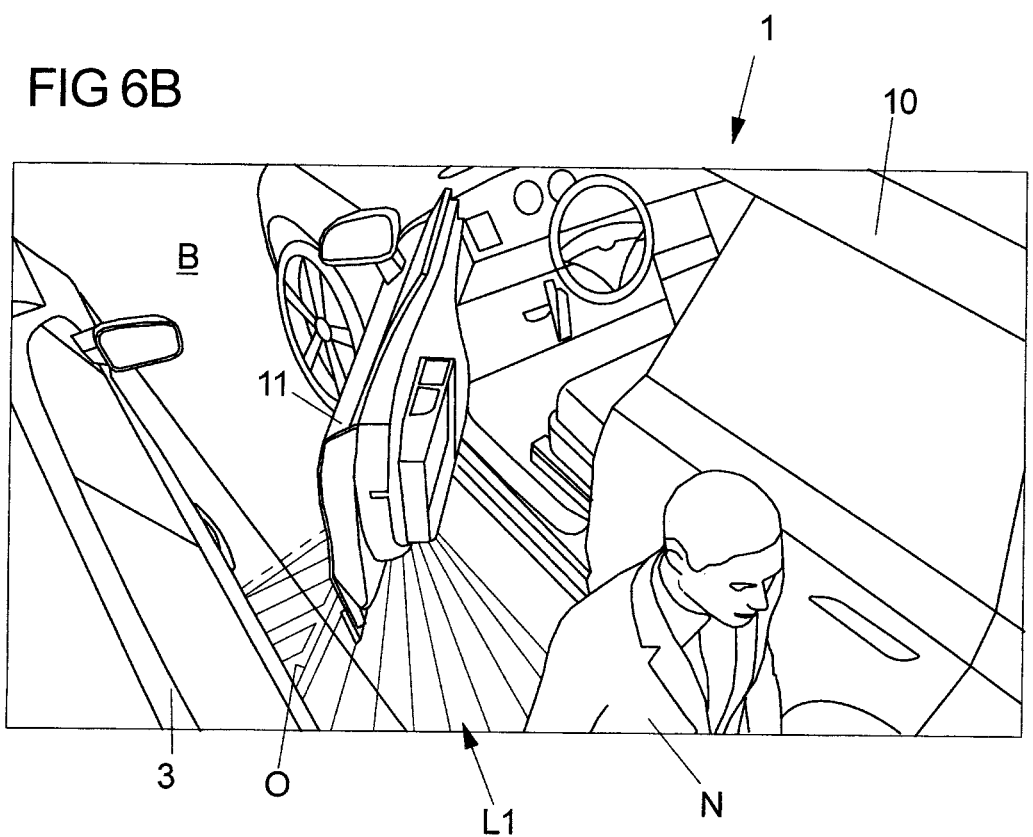
Figure 7:
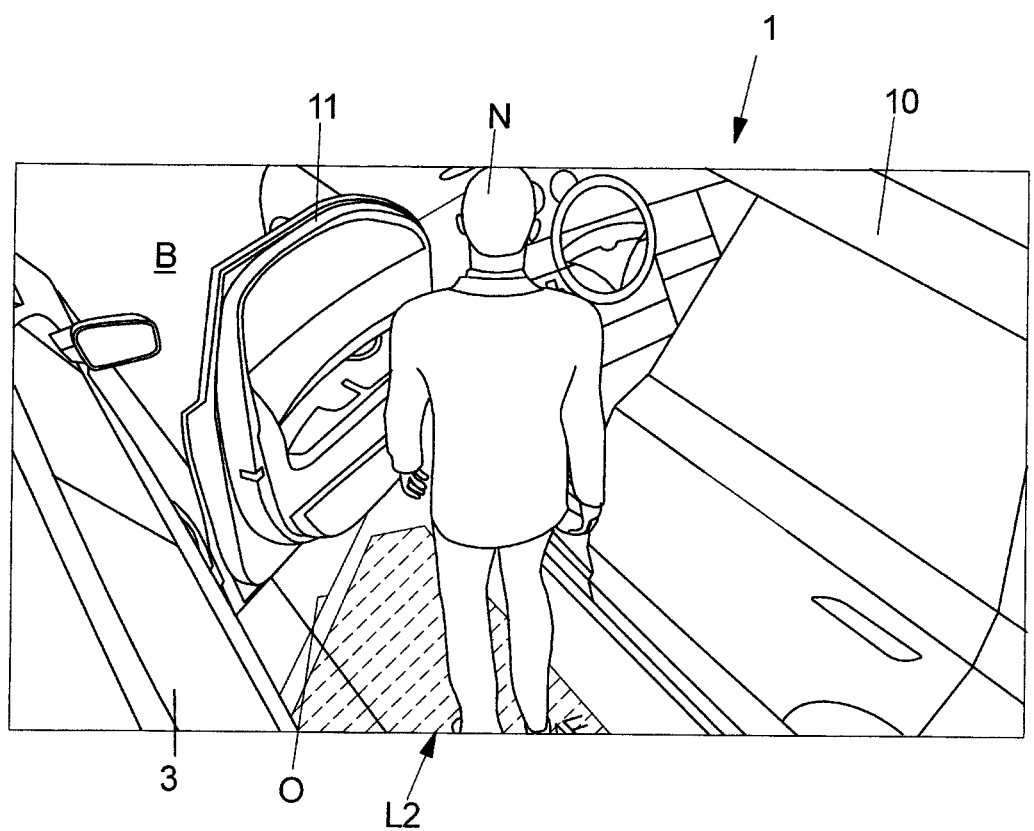
FIG. 7 shows a view of the vehicle with open vehicle door as shown in FIGS. 6A, 6B.

As is shown in FIGS. 6A, 6B and 7, the first light signal L1 and the second light signal L2 can be dependent on a concrete adjusting movement of the vehicle door 11, in particular on the concrete opening position of the vehicle door 11. When it is recognized for example by means of the sensor device 17, as this is shown in FIGS. 6A, 6B, that beside the vehicle 1 a foreign vehicle 3 is parked and the vehicle door 11 thus cannot be opened completely, the opening limit O for opening the vehicle door 11 correspondingly can be fixed such that the vehicle door 11 does not collide with the foreign vehicle 3 on opening. The first light signal L1 is adapted correspondingly, which thus indicates the current adjustment range with the adapted opening limit O, as this is shown in FIGS. 6A and 6B. In this case, by a marked region on the other side of the opening limit O the first light signal L1 in particular also indicates that the vehicle door 11 is not opened completely.

When the vehicle door 11 has been opened up to the opening limit O, as this is shown in FIG. 7, a corresponding second light signal L2 is displayed, which signals a boarding region (limited by the adapted opening limit O) to the user N.

FIGS. 8A to 8C show different examples of first light signals L1 for indicating an adjusting movement of the vehicle door 11, which for example can also be configured according to user wishes.

Figure 9A:
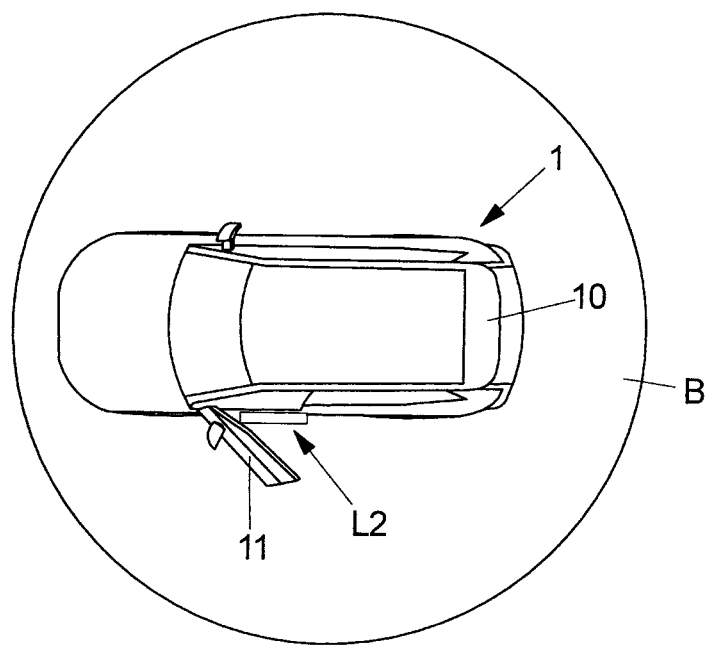
FIGS. 9A, 9B show views of a vehicle, with a second light signal with open vehicle side door.
Figure 9B:
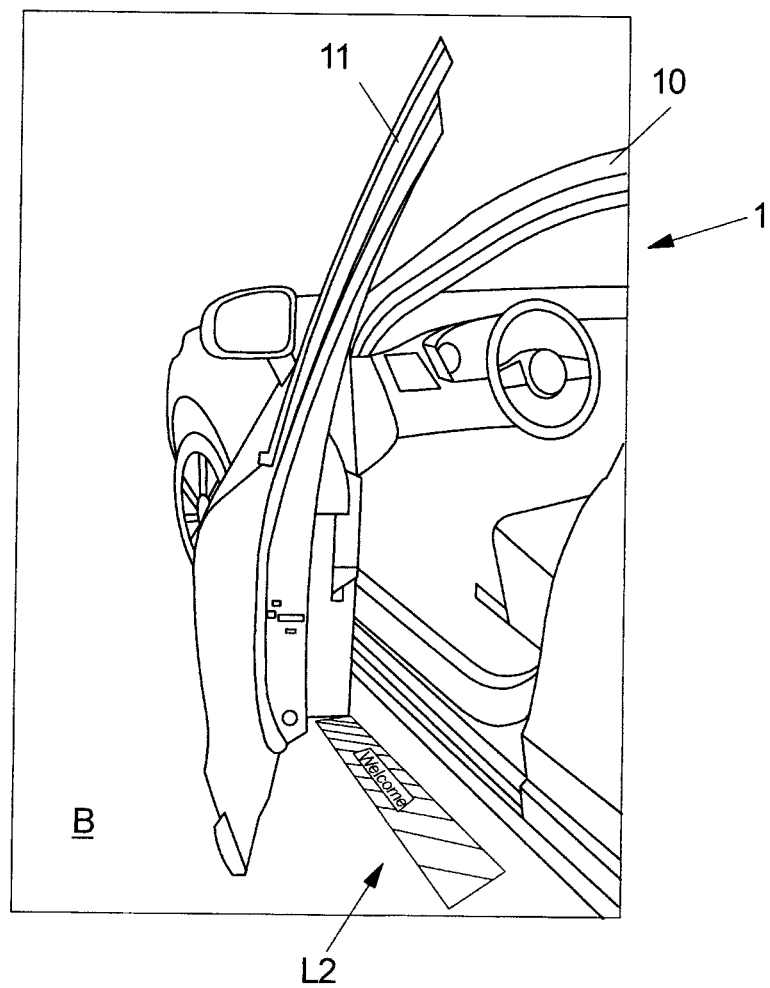
Figure 10:
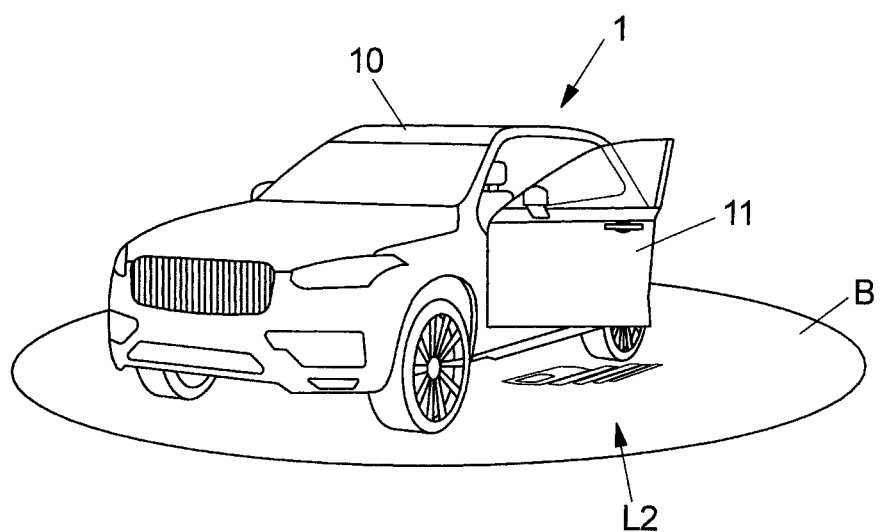
FIG. 10 shows a view of a vehicle with another second light signal.

FIGS. 9A, 9B and 10 on the other hand show different examples of second light signals L2 for marking a boarding region and for welcoming a user N, which likewise can be configurable user-dependently.

Figure 11:
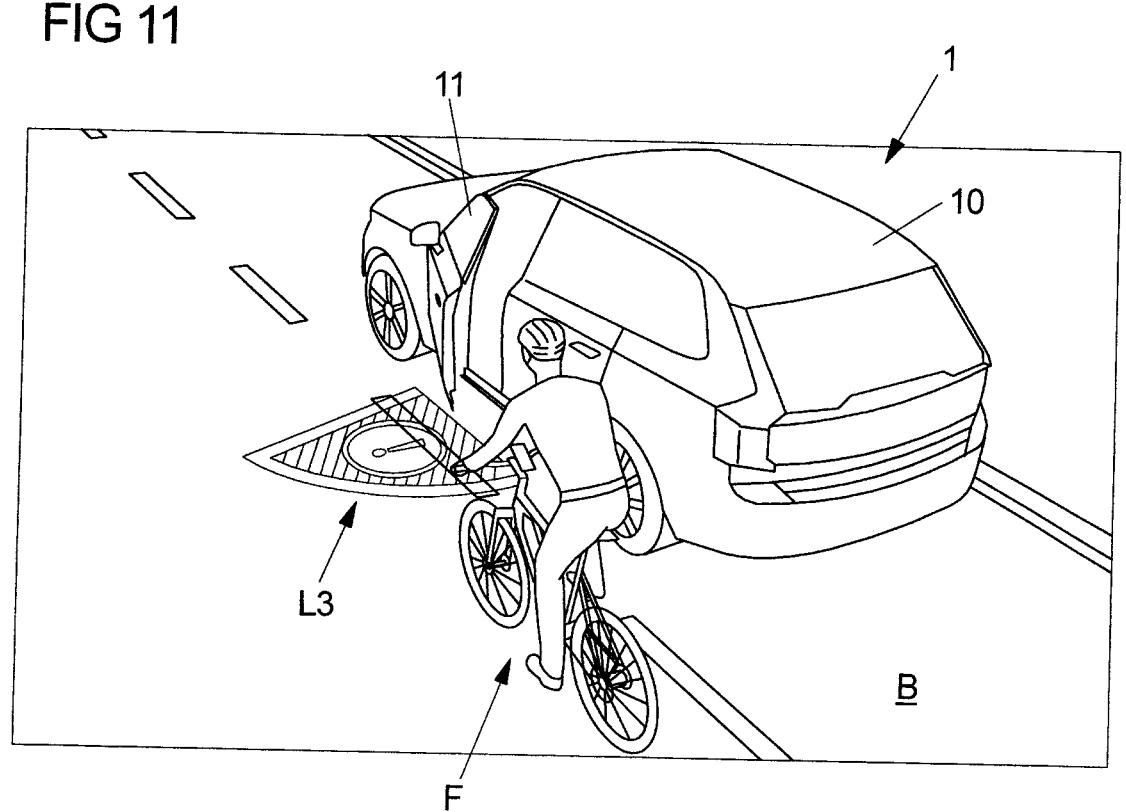
FIG. 11 shows a view of a vehicle with a third light signal for warning against a collision with the vehicle side door.

By means of the sensor device 17 it can possibly also be recognized whether on opening of the vehicle door 11 or when the vehicle door 11 is in the open position there possibly is a risk of collision with an approaching, dynamic object, such as for example a cyclist F, as this is illustrated in FIG. 11. When an evaluation of sensor signals of the sensor device 17 by the control device 13 reveals that there possibly is a risk of collision, the control device 13 can actuate the projection device 15 for generating a suitable third light signal L3 that warns a user N and in particular also the approaching cyclist F against such a collision and for this purpose marks the adjustment range of the vehicle door 11 and in addition outputs a suitable warning signal ("!").

In addition, for example an acoustic warning signal, such as a horn signal or the like, can also be generated, so that the cyclist in addition is warned acoustically.

Figure 12:
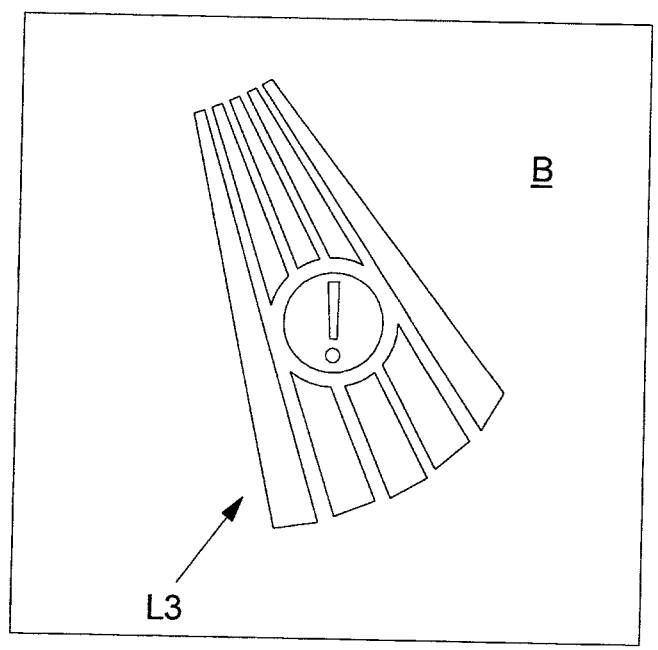
FIG. 12 shows a separate view of an example of a third light signal.

FIG. 12 shows another example of such a third light signal L3.

Figure 13:
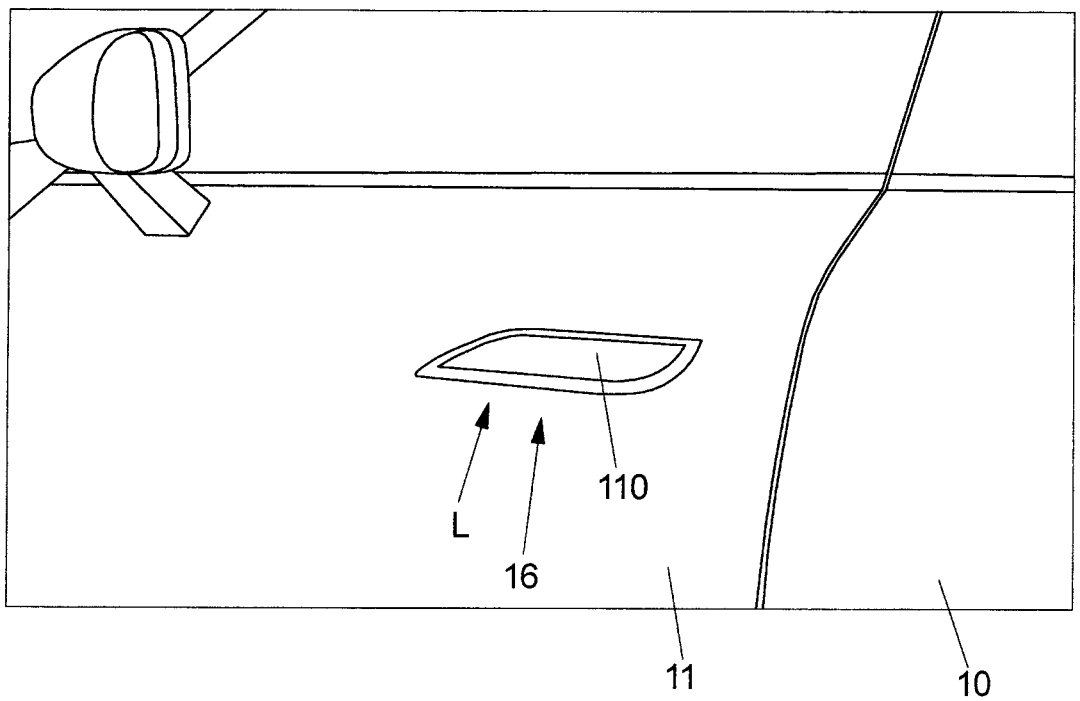
FIG. 13 shows a view of a section of a vehicle side door with a door handle of a vehicle, with a light element in the form of an LED strip arranged thereon.
Figure 14:
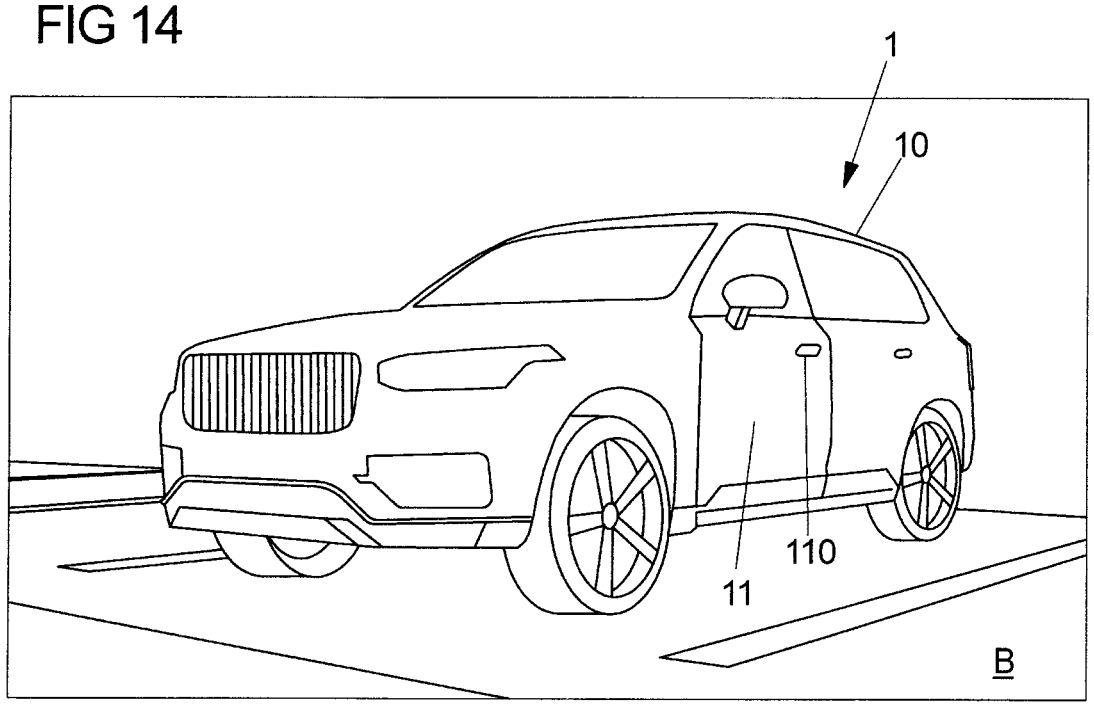
FIG. 14 shows a view of a vehicle with light elements on door handles.

In addition or as an alternative to the projection of light signals via the projection device 15, light signals can also be generated and output via the light element 16, which for example is formed by an LED strip extending around a handle 110 of a vehicle door 11, as this is illustrated in FIGS. 13 and 14. The light element 16 for example can generate signals that indicate an opening of the vehicle door 11 and signal to the user N that the open position is reached and he/she thus can board the vehicle 1.

The light signals generated by the projection device 15 and/or the light element 16 in principle can be static or dynamic. It here is conceivable and possible that the light signals include static elements and dynamic elements that are shown superimposed (for example static arrows can be superimposed with temporally variable, dynamic arrows).

The light signals generated by the projection device 15 and/or the light element 16 in particular can also be different in their color. For example, the first light signal L1 can have a first color (e.g. red), while the second light signal L2 is shown in a second color (e.g. green). The coloring of the light signals L1, L2, L3 can also be variable, or each signal can include different signal elements with different colors.

The light signals generated by the projection device 15 and/or the light element 16 can include graphical elements and also text elements for displaying information. In particular, words ("Welcome", "Vorsicht!" or the like) can also be output and displayed by means of the light signals in order to provide concrete indications.

The invention is not limited to the exemplary embodiments described above, but can also be realized in principle in a completely different way.

A system as described here can serve not only for adjusting a vehicle door, but also for adjusting other closure elements, for example a liftgate.

Different light generating devices can be used here and be arranged at entirely different places in or on a vehicle.

LIST OF REFERENCE NUMERALS 1 vehicle
10 vehicle body
11 closure element (vehicle door)
12 adjustment drive
13 control device
14 communication device
15 projection device
16 light element (LED strip)
17 sensor device
2 communication device
3 foreign vehicle
B ground
F cyclist
L light projection
L1, L2, L3 light signal
N user
O opening limit

The invention claimed is:

1. A system for adjusting a closure element of a vehicle, the system comprising
an adjustment drive configured to adjust the closure element relative to a vehicle body of the vehicle between a closed position and an open position;
a control device configured to actuate the adjustment drive for executing an adjusting movement of the closure element between the closed position and the open position; and
a light generating device configured to generate a light signal visible to a user;
wherein the control device is configured to actuate the light generating device, wherein the light generating device is configured to generate, upon actuation, a first visible light signal during an adjusting movement of the closure element and a second visible light signal different than the first visible light signal when the closure element is in the open position, said first visible light signal being configured to inform a user that the closure element is moving and said second light signal being configured to indicate to a user that the closure element is in the open position;
wherein the light generating device includes a projection device configured to generate a visible light projection on a ground outside the vehicle.

2. The system according to claim 1, wherein the light generating device includes a light element arranged on the vehicle body or the closure element.

3. The system according to claim 1, wherein the first visible light signal marks a region across which the closure element is moved during an adjustment operation.

4. The system according to claim 1, wherein the first visible light signal marks an opening limit up to which the closure element is opened during an opening operation.

5. The system according to claim 1, wherein the first visible light signal is temporally variable.

6. The system according to claim 1, wherein the second visible light signal marks an access region providing for an access of a user to the vehicle.

7. The system according to claim 1, wherein the second visible light signal is temporally variable.

8. The system according to claim 1, further comprising a sensor device configured to detect at least one an object in a path of movement of the closure element and a collision with an object.

9. The system according to claim 8, wherein the control device is configured to set, based on a detection of the sensor device, an opening limit up to which the closure element is opened, wherein the first visible light signal indicates the opening limit.

10. The system according to claim 9, wherein the control device is configured to generate the second visible light signal based on the opening limit.

11. The system according to claim 8, wherein the control device is configured to actuate the light generating device, the light generating device being configured to generate, upon actuation, a third visible light signal based on a detection of said sensor device.

* * * * *